US012589300B2

(12) United States Patent
Morelli et al.

(10) Patent No.: US 12,589,300 B2
(45) Date of Patent: Mar. 31, 2026

(54) SYSTEMS AND METHODS FOR IMPROVED CORNER SLICING IN A MULTIPLAYER VIDEO GAME

(71) Applicant: Activision Publishing, Inc., Santa Monica, CA (US)

(72) Inventors: Juan Morelli, Raleigh, NC (US); Eugene Michael Barnes, Santa Monica, CA (US); Pablo Manuel Ortiz, Culver City, CA (US); Matthew Kyle Scronce, Marina Del Rey, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 248 days.

(21) Appl. No.: 18/473,697

(22) Filed: Sep. 25, 2023

(65) Prior Publication Data

US 2024/0108982 A1     Apr. 4, 2024

Related U.S. Application Data

(60) Provisional application No. 63/377,760, filed on Sep. 30, 2022.

(51) Int. Cl.
*A63F 13/5258*     (2014.01)
*A63F 13/56*     (2014.01)

(52) U.S. Cl.
CPC .......... *A63F 13/5258* (2014.09); *A63F 13/56* (2014.09)

(58) Field of Classification Search
CPC .... A63F 13/52; A63F 13/525; A63F 13/5258; A63F 13/56; A63F 13/822; A63F 13/837
See application file for complete search history.

(56) References Cited

U.S. PATENT DOCUMENTS

| | | | |
|---|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — Steven J Hylinski

(74) *Attorney, Agent, or Firm* — Novel IP

(57) ABSTRACT

Systems and methods for enabling automated, gradual visual rotation of a player's weapon and arms view model around an edge that the player intends to corner slice include imparting realistic motion and dynamism to the player's weapon and arms view model as the player engages in cover negotiation. The weapon and arms view model rolls and translates away from the edge in hip mode and rolls away from the edge in ADS (Aim Down Sight) mode so that the weapon and arms view model is canted away from the edge while being centered on the sight.

21 Claims, 4 Drawing Sheets

(56) References Cited

U.S. PATENT DOCUMENTS

| | | | |
|---|---|---|---|
| 5,835,692 A | 11/1998 | Cragun | |
| 5,853,324 A * | 12/1998 | Kami | A63F 13/218 |
| | | | 463/2 |
| 5,878,233 A | 3/1999 | Schloss | |
| 5,883,628 A | 3/1999 | Mullaly | |
| 5,900,879 A | 5/1999 | Berry | |
| 5,903,266 A | 5/1999 | Berstis | |
| 5,903,271 A | 5/1999 | Bardon | |
| 5,911,045 A | 6/1999 | Leyba | |
| 5,920,325 A | 7/1999 | Morgan | |
| 5,923,324 A | 7/1999 | Berry | |
| 5,969,724 A | 10/1999 | Berry | |
| 5,977,979 A | 11/1999 | Clough | |
| 5,990,888 A | 11/1999 | Blades | |
| 6,014,145 A | 1/2000 | Bardon | |
| 6,025,839 A | 2/2000 | Schell | |
| 6,059,842 A | 5/2000 | Dumarot | |
| 6,069,632 A | 5/2000 | Mullaly | |
| 6,081,270 A | 6/2000 | Berry | |
| 6,081,271 A | 6/2000 | Bardon | |
| 6,091,410 A | 7/2000 | Lection | |
| 6,094,196 A | 7/2000 | Berry | |
| 6,098,056 A | 8/2000 | Rusnak | |
| 6,104,406 A | 8/2000 | Berry | |
| 6,111,581 A | 8/2000 | Berry | |
| 6,134,588 A | 10/2000 | Guenthner | |
| 6,144,381 A | 11/2000 | Lection | |
| 6,148,328 A | 11/2000 | Cuomo | |
| 6,185,614 B1 | 2/2001 | Cuomo | |
| 6,201,881 B1 | 3/2001 | Masuda | |
| 6,222,551 B1 | 4/2001 | Schneider | |
| 6,271,842 B1 | 8/2001 | Bardon | |
| 6,271,843 B1 | 8/2001 | Lection | |
| 6,282,547 B1 | 8/2001 | Hirsch | |
| 6,311,206 B1 | 10/2001 | Malkin | |
| 6,334,141 B1 | 12/2001 | Varma | |
| 6,336,134 B1 | 1/2002 | Varma | |
| 6,337,700 B1 | 1/2002 | Kinoe | |
| 6,353,449 B1 | 3/2002 | Gregg | |
| 6,356,297 B1 | 3/2002 | Cheng | |
| 6,411,312 B1 | 6/2002 | Sheppard | |
| 6,426,757 B1 | 7/2002 | Smith | |
| 6,445,389 B1 | 9/2002 | Bossen | |
| 6,452,593 B1 | 9/2002 | Challener | |
| 6,462,760 B1 | 10/2002 | Cox, Jr. | |
| 6,469,712 B1 | 10/2002 | Hilpert, Jr. | |
| 6,473,085 B1 | 10/2002 | Brock | |
| 6,499,053 B1 | 12/2002 | Marquette | |
| 6,505,208 B1 | 1/2003 | Kanevsky | |
| 6,525,731 B1 | 2/2003 | Suits | |
| 6,549,933 B1 | 4/2003 | Barrett | |
| 6,567,109 B1 | 5/2003 | Todd | |
| 6,618,751 B1 | 9/2003 | Challenger | |
| RE38,375 E | 12/2003 | Herzberg | |
| 6,657,617 B2 | 12/2003 | Paolini | |
| 6,657,642 B1 | 12/2003 | Bardon | |
| 6,684,255 B1 | 1/2004 | Martin | |
| 6,699,127 B1 | 3/2004 | Lobb | |
| 6,717,600 B2 | 4/2004 | Dutta | |
| 6,734,884 B1 | 5/2004 | Berry | |
| 6,765,596 B2 | 7/2004 | Lection | |
| 6,781,607 B1 | 8/2004 | Benham | |
| 6,819,669 B2 | 11/2004 | Rooney | |
| 6,832,239 B1 | 12/2004 | Kraft | |
| 6,836,480 B2 | 12/2004 | Basso | |
| 6,886,026 B1 | 4/2005 | Hanson | |
| 6,948,168 B1 | 9/2005 | Kuprionas | |
| RE38,865 E | 11/2005 | Dumarot | |
| 6,993,596 B2 | 1/2006 | Hinton | |
| 7,028,296 B2 | 4/2006 | Irfan | |
| 7,062,533 B2 | 6/2006 | Brown | |
| 7,143,409 B2 | 11/2006 | Herrero | |
| 7,209,137 B2 | 4/2007 | Brokenshire | |
| 7,230,616 B2 | 6/2007 | Taubin | |
| 7,249,123 B2 | 7/2007 | Elder | |
| 7,263,511 B2 | 8/2007 | Bodin | |
| 7,287,053 B2 | 10/2007 | Bodin | |
| 7,305,438 B2 | 12/2007 | Christensen | |
| 7,308,476 B2 | 12/2007 | Mannaru | |
| 7,403,202 B1 | 7/2008 | Nash | |
| 7,404,149 B2 | 7/2008 | Fox | |
| 7,426,538 B2 | 9/2008 | Bodin | |
| 7,427,980 B1 | 9/2008 | Partridge | |
| 7,428,588 B2 | 9/2008 | Berstis | |
| 7,429,987 B2 | 9/2008 | Leah | |
| 7,436,407 B2 | 10/2008 | Doi | |
| 7,439,975 B2 | 10/2008 | Hsu | |
| 7,443,393 B2 | 10/2008 | Shen | |
| 7,447,996 B1 | 11/2008 | Cox | |
| 7,467,181 B2 | 12/2008 | McGowan | |
| 7,475,354 B2 | 1/2009 | Guido | |
| 7,478,127 B2 | 1/2009 | Creamer | |
| 7,484,012 B2 | 1/2009 | Hinton | |
| 7,503,007 B2 | 3/2009 | Goodman | |
| 7,506,264 B2 | 3/2009 | Polan | |
| 7,515,136 B1 | 4/2009 | Kanevsky | |
| 7,525,964 B2 | 4/2009 | Astley | |
| 7,552,177 B2 | 6/2009 | Kessen | |
| 7,565,650 B2 | 7/2009 | Bhogal | |
| 7,571,224 B2 | 8/2009 | Childress | |
| 7,571,389 B2 | 8/2009 | Broussard | |
| 7,580,888 B2 | 8/2009 | Ur | |
| 7,596,596 B2 | 9/2009 | Chen | |
| 7,640,587 B2 | 12/2009 | Fox | |
| 7,667,701 B2 | 2/2010 | Leah | |
| 7,698,656 B2 | 4/2010 | Srivastava | |
| 7,702,784 B2 | 4/2010 | Berstis | |
| 7,714,867 B2 | 5/2010 | Doi | |
| 7,719,532 B2 | 5/2010 | Schardt | |
| 7,719,535 B2 | 5/2010 | Tadokoro | |
| 7,734,691 B2 | 6/2010 | Creamer | |
| 7,737,969 B2 | 6/2010 | Shen | |
| 7,743,095 B2 | 6/2010 | Goldberg | |
| 7,747,679 B2 | 6/2010 | Galvin | |
| 7,765,478 B2 | 7/2010 | Reed | |
| 7,768,514 B2 | 8/2010 | Pagan | |
| 7,773,087 B2 | 8/2010 | Fowler | |
| 7,774,407 B2 | 8/2010 | Daly | |
| 7,782,318 B2 | 8/2010 | Shearer | |
| 7,792,263 B2 | 9/2010 | D Amora | |
| 7,792,801 B2 | 9/2010 | Hamilton, II | |
| 7,796,128 B2 | 9/2010 | Radzikowski | |
| 7,808,500 B2 | 10/2010 | Shearer | |
| 7,814,152 B2 | 10/2010 | McGowan | |
| 7,827,318 B2 | 11/2010 | Hinton | |
| 7,843,471 B2 | 11/2010 | Doan | |
| 7,844,663 B2 | 11/2010 | Boutboul | |
| 7,847,799 B2 | 12/2010 | Taubin | |
| 7,856,469 B2 | 12/2010 | Chen | |
| 7,873,485 B2 | 1/2011 | Castelli | |
| 7,882,222 B2 | 2/2011 | Dolbier | |
| 7,882,243 B2 | 2/2011 | Ivory | |
| 7,884,819 B2 | 2/2011 | Kuesel | |
| 7,886,045 B2 | 2/2011 | Bates | |
| 7,890,623 B2 | 2/2011 | Bates | |
| 7,893,936 B2 | 2/2011 | Shearer | |
| 7,904,829 B2 | 3/2011 | Fox | |
| 7,921,128 B2 | 4/2011 | Hamilton, II | |
| 7,940,265 B2 | 5/2011 | Brown | |
| 7,945,620 B2 | 5/2011 | Bou-Ghannam | |
| 7,945,802 B2 | 5/2011 | Hamilton, II | |
| 7,970,837 B2 | 6/2011 | Lyle | |
| 7,970,840 B2 | 6/2011 | Cannon | |
| 7,985,138 B2 | 7/2011 | Acharya | |
| 7,990,387 B2 | 8/2011 | Hamilton, II | |
| 7,996,164 B2 | 8/2011 | Hamilton, II | |
| 8,001,161 B2 | 8/2011 | Finn | |
| 8,004,518 B2 | 8/2011 | Fowler | |
| 8,005,025 B2 | 8/2011 | Bodin | |
| 8,006,182 B2 | 8/2011 | Bates | |
| 8,013,861 B2 | 9/2011 | Hamilton, II | |
| 8,018,453 B2 | 9/2011 | Fowler | |
| 8,018,462 B2 | 9/2011 | Bhogal | |
| 8,019,797 B2 | 9/2011 | Hamilton, II | |

(56)　　　　　References Cited

U.S. PATENT DOCUMENTS

| | | | |
|---|---|---|---|
| 8,019,858 B2 | 9/2011 | Bauchot | |
| 8,022,948 B2 | 9/2011 | Garbow | |
| 8,022,950 B2 | 9/2011 | Brown | |
| 8,026,913 B2 | 9/2011 | Garbow | |
| 8,028,021 B2 | 9/2011 | Reisinger | |
| 8,028,022 B2 | 9/2011 | Brownholtz | |
| 8,037,416 B2 | 10/2011 | Bates | |
| 8,041,614 B2 | 10/2011 | Bhogal | |
| 8,046,700 B2 | 10/2011 | Bates | |
| 8,051,462 B2 | 11/2011 | Hamilton, II | |
| 8,055,656 B2 | 11/2011 | Cradick | |
| 8,056,121 B2 | 11/2011 | Hamilton, II | |
| 8,057,307 B2 | 11/2011 | Berstis | |
| 8,062,130 B2 | 11/2011 | Smith | |
| 8,063,905 B2 | 11/2011 | Brown | |
| 8,070,601 B2 | 12/2011 | Acharya | |
| 8,082,245 B2 | 12/2011 | Bates | |
| 8,085,267 B2 | 12/2011 | Brown | |
| 8,089,481 B2 | 1/2012 | Shearer | |
| 8,092,288 B2 | 1/2012 | Theis | |
| 8,095,881 B2 | 1/2012 | Reisinger | |
| 8,099,338 B2 | 1/2012 | Betzler | |
| 8,099,668 B2 | 1/2012 | Garbow | |
| 8,102,334 B2 | 1/2012 | Brown | |
| 8,103,640 B2 | 1/2012 | Lo | |
| 8,103,959 B2 | 1/2012 | Cannon | |
| 8,105,165 B2 | 1/2012 | Karstens | |
| 8,108,774 B2 | 1/2012 | Finn | |
| 8,113,959 B2 | 2/2012 | De Judicibus | |
| 8,117,551 B2 | 2/2012 | Cheng | |
| 8,125,485 B2 | 2/2012 | Brown | |
| 8,127,235 B2 | 2/2012 | Haggar | |
| 8,127,236 B2 | 2/2012 | Hamilton, II | |
| 8,128,487 B2 | 3/2012 | Hamilton, II | |
| 8,131,740 B2 | 3/2012 | Cradick | |
| 8,132,235 B2 | 3/2012 | Bussani | |
| 8,134,560 B2 | 3/2012 | Bates | |
| 8,139,060 B2 | 3/2012 | Brown | |
| 8,139,780 B2 | 3/2012 | Shearer | |
| 8,140,340 B2 | 3/2012 | Bhogal | |
| 8,140,620 B2 | 3/2012 | Creamer | |
| 8,140,978 B2 | 3/2012 | Betzler | |
| 8,140,982 B2 | 3/2012 | Hamilton, II | |
| 8,142,286 B2 * | 3/2012 | Sayyadi | A63F 13/22 |
| | | | 463/43 |
| 8,145,676 B2 | 3/2012 | Bhogal | |
| 8,145,725 B2 | 3/2012 | Dawson | |
| 8,149,241 B2 | 4/2012 | Do | |
| 8,151,191 B2 | 4/2012 | Nicol, II | |
| 8,156,184 B2 | 4/2012 | Kurata | |
| 8,165,350 B2 | 4/2012 | Fuhrmann | |
| 8,171,407 B2 | 5/2012 | Huang | |
| 8,171,408 B2 | 5/2012 | Dawson | |
| 8,171,559 B2 | 5/2012 | Hamilton, II | |
| 8,174,541 B2 | 5/2012 | Greene | |
| 8,176,421 B2 | 5/2012 | Dawson | |
| 8,176,422 B2 | 5/2012 | Bergman | |
| 8,184,092 B2 | 5/2012 | Cox | |
| 8,184,116 B2 | 5/2012 | Finn | |
| 8,185,450 B2 | 5/2012 | Mcvey | |
| 8,185,829 B2 | 5/2012 | Cannon | |
| 8,187,067 B2 | 5/2012 | Hamilton, II | |
| 8,199,145 B2 | 6/2012 | Hamilton, II | |
| 8,203,561 B2 | 6/2012 | Carter | |
| 8,214,335 B2 | 7/2012 | Hamilton, II | |
| 8,214,433 B2 | 7/2012 | Dawson | |
| 8,214,750 B2 | 7/2012 | Hamilton, II | |
| 8,214,751 B2 | 7/2012 | Dawson | |
| 8,217,953 B2 | 7/2012 | Comparan | |
| 8,219,616 B2 | 7/2012 | Dawson | |
| 8,230,045 B2 | 7/2012 | Kawachiya | |
| 8,230,338 B2 | 7/2012 | Dugan | |
| 8,233,005 B2 | 7/2012 | Finn | |
| 8,234,234 B2 | 7/2012 | Shearer | |
| 8,234,579 B2 | 7/2012 | Do | |
| 8,239,775 B2 | 8/2012 | Beverland | |
| 8,241,131 B2 | 8/2012 | Bhogal | |
| 8,245,241 B2 | 8/2012 | Hamilton, II | |
| 8,245,283 B2 | 8/2012 | Dawson | |
| 8,265,253 B2 | 9/2012 | D Amora | |
| 8,310,497 B2 | 11/2012 | Comparan | |
| 8,334,871 B2 | 12/2012 | Hamilton, II | |
| 8,360,886 B2 | 1/2013 | Karstens | |
| 8,364,804 B2 | 1/2013 | Childress | |
| 8,425,326 B2 | 4/2013 | Chudley | |
| 8,442,946 B2 | 5/2013 | Hamilton, II | |
| 8,506,372 B2 | 8/2013 | Chudley | |
| 8,514,249 B2 | 8/2013 | Hamilton, II | |
| 8,554,841 B2 | 10/2013 | Kurata | |
| 8,556,695 B2 * | 10/2013 | Nishimura | A63F 13/5258 |
| | | | 463/9 |
| 8,607,142 B2 | 12/2013 | Bergman | |
| 8,607,356 B2 | 12/2013 | Hamilton, II | |
| 8,624,903 B2 | 1/2014 | Hamilton, II | |
| 8,626,836 B2 | 1/2014 | Dawson | |
| 8,692,835 B2 | 4/2014 | Hamilton, II | |
| 8,721,412 B2 | 5/2014 | Chudley | |
| 8,827,816 B2 | 9/2014 | Bhogal | |
| 8,838,640 B2 | 9/2014 | Bates | |
| 8,849,917 B2 | 9/2014 | Dawson | |
| 8,911,296 B2 | 12/2014 | Chudley | |
| 8,992,316 B2 | 3/2015 | Smith | |
| 9,083,654 B2 | 7/2015 | Dawson | |
| 9,142,034 B2 | 9/2015 | Hoof | |
| 9,152,914 B2 | 10/2015 | Haggar | |
| 9,205,328 B2 | 12/2015 | Bansi | |
| 9,286,731 B2 | 3/2016 | Hamilton, II | |
| 9,299,080 B2 | 3/2016 | Dawson | |
| 9,364,746 B2 | 6/2016 | Chudley | |
| 9,525,746 B2 | 12/2016 | Bates | |
| 9,583,109 B2 | 2/2017 | Kurata | |
| 9,682,324 B2 | 6/2017 | Bansi | |
| 9,764,244 B2 | 9/2017 | Bansi | |
| 9,789,406 B2 | 10/2017 | Marr | |
| 9,808,722 B2 | 11/2017 | Kawachiya | |
| 10,410,418 B2 | 9/2019 | Kiuchi | |
| 10,489,986 B2 | 11/2019 | Kaifosh | |
| 10,902,618 B2 | 1/2021 | Payne | |
| 11,305,191 B2 | 4/2022 | Tieger | |
| 11,420,122 B2 | 8/2022 | Sanders | |
| 11,439,904 B2 | 9/2022 | Stine | |
| 11,623,145 B1 * | 4/2023 | Pineda | A63F 13/5252 |
| | | | 463/31 |
| 11,794,104 B2 | 10/2023 | Stine | |
| 11,839,814 B2 | 12/2023 | Sanders | |
| 12,005,357 B2 | 6/2024 | Tieger | |
| 12,172,075 B2 | 12/2024 | Stine | |
| 2004/0157662 A1 | 8/2004 | Tsuchiya | |
| 2004/0176164 A1 | 9/2004 | Kobayashi | |
| 2004/0219980 A1 | 11/2004 | Bassett | |
| 2004/0224741 A1 | 11/2004 | Jen | |
| 2004/0224761 A1 | 11/2004 | Nishimura | |
| 2005/0009602 A1 | 1/2005 | Nishimura | |
| 2005/0059488 A1 * | 3/2005 | Larsen | A63F 13/213 |
| | | | 463/36 |
| 2006/0040740 A1 * | 2/2006 | DiDato | A63F 13/42 |
| | | | 463/7 |
| 2006/0246968 A1 | 11/2006 | Dyke-Wells | |
| 2007/0117635 A1 | 5/2007 | Spanton | |
| 2009/0113448 A1 | 4/2009 | Smith | |
| 2009/0135187 A1 | 5/2009 | Lee | |
| 2009/0262112 A1 | 10/2009 | Yoshimura | |
| 2010/0009734 A1 * | 1/2010 | Sambongi | A63F 13/422 |
| | | | 463/5 |
| 2010/0166056 A1 | 7/2010 | Perlman | |
| 2014/0002580 A1 | 1/2014 | Bear | |
| 2014/0113718 A1 | 4/2014 | Norman | |
| 2014/0125576 A1 | 5/2014 | Asuke | |
| 2014/0213353 A1 | 7/2014 | Lee | |
| 2014/0344725 A1 | 11/2014 | Bates | |
| 2016/0191671 A1 | 6/2016 | Dawson | |
| 2017/0157512 A1 | 6/2017 | Long | |
| 2018/0161682 A1 | 6/2018 | Myhill | |
| 2019/0083885 A1 | 3/2019 | Yee | |

(56) References Cited

U.S. PATENT DOCUMENTS

| | | | |
|---|---|---|---|
| 2019/0351325 | A1 | 11/2019 | Spradling |
| 2019/0366211 | A1 | 12/2019 | Suzuki |
| 2020/0038755 | A1 | 2/2020 | Kojima |
| 2021/0093969 | A1 | 4/2021 | Mccoy |
| 2022/0143502 | A1 | 5/2022 | Stine |
| 2024/0100426 | A1 | 3/2024 | Sanders |
| 2024/0316456 | A1 | 9/2024 | Tieger |

FOREIGN PATENT DOCUMENTS

| | | | |
|---|---|---|---|
| CA | 2143874 | | 6/2000 |
| CA | 2292678 | | 7/2005 |
| CA | 2552135 | | 7/2013 |
| CN | 1334650 | A | 2/2002 |
| CN | 1202652 | C | 10/2002 |
| CN | 1141641 | C | 3/2004 |
| CN | 1494679 | A | 5/2004 |
| CN | 1219384 | | 9/2005 |
| CN | 1307544 | | 3/2007 |
| CN | 100407675 | | 7/2008 |
| CN | 100423016 | C | 10/2008 |
| CN | 100557637 | | 11/2009 |
| CN | 101001678 | B | 5/2010 |
| CN | 101436242 | | 12/2010 |
| CN | 101801482 | B | 12/2014 |
| EP | 668583 | | 8/1995 |
| EP | 0627728 | B1 | 9/2000 |
| EP | 0717337 | B1 | 8/2001 |
| EP | 0679977 | B1 | 10/2002 |
| EP | 0679978 | B1 | 3/2003 |
| EP | 0890924 | B1 | 9/2003 |
| EP | 1377902 | B1 | 8/2004 |
| EP | 0813132 | B1 | 1/2005 |
| EP | 1380133 | B1 | 3/2005 |
| EP | 1021021 | B1 | 9/2005 |
| EP | 0930584 | B1 | 10/2005 |
| EP | 0883087 | B1 | 8/2007 |
| EP | 1176828 | B1 | 10/2007 |
| EP | 2076888 | B1 | 7/2015 |
| GB | 2339938 | | 10/2002 |
| GB | 2352154 | | 7/2003 |
| JP | 3033956 | B2 | 4/2000 |
| JP | 3124916 | B2 | 1/2001 |
| JP | 3177221 | B2 | 6/2001 |
| JP | 3199231 | B2 | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| MY | 117864 | A | 8/2004 |
| SG | 55396 | | 12/1998 |
| WO | 2002073457 | | 9/2002 |
| WO | 20020087156 | | 10/2002 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

* cited by examiner

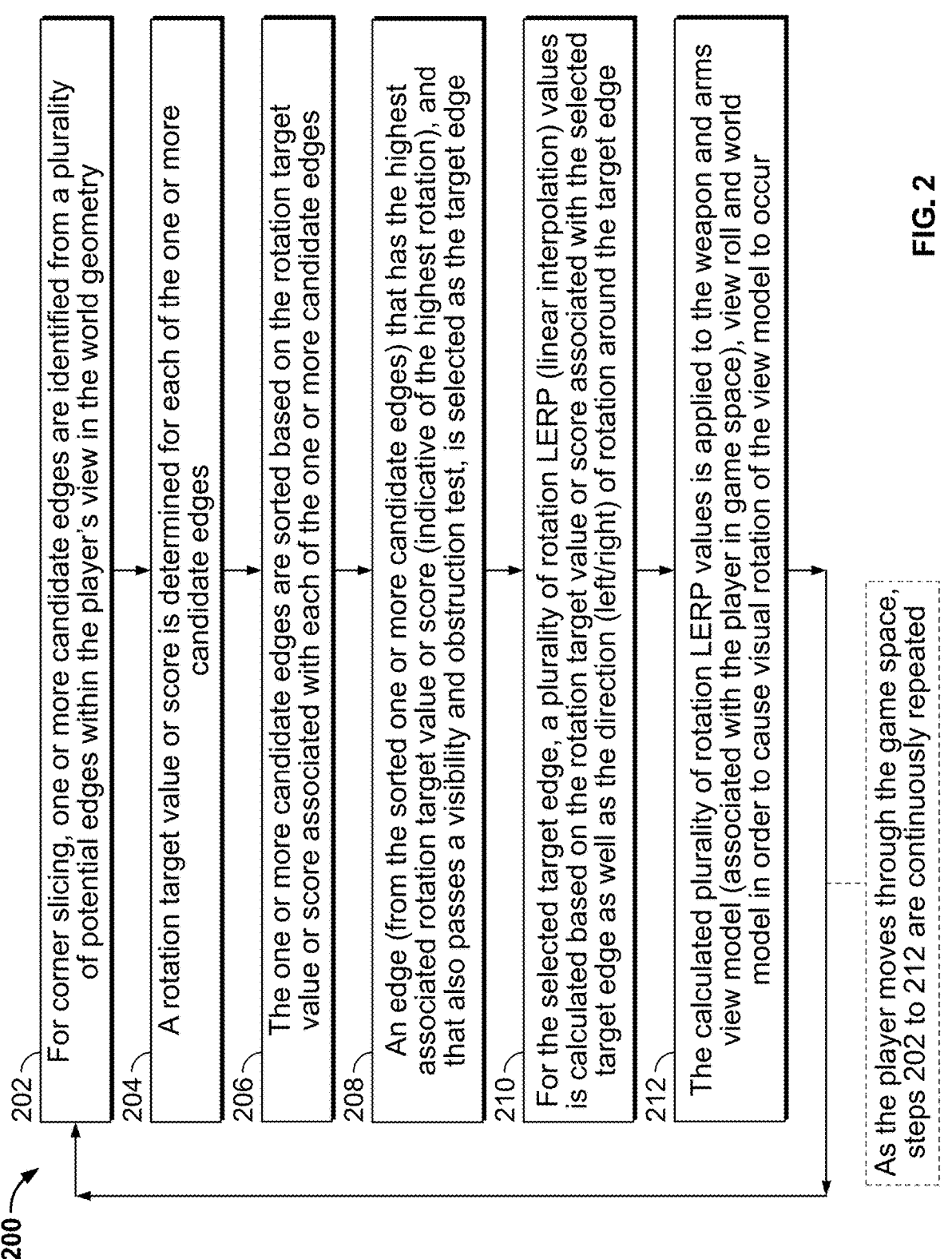

200

202 For corner slicing, one or more candidate edges are identified from a plurality of potential edges within the player's view in the world geometry 204 A rotation target value or score is determined for each of the one or more candidate edges 206 The one or more candidate edges are sorted based on the rotation target value or score associated with each of the one or more candidate edges 208 An edge (from the sorted one or more candidate edges) that has the highest associated rotation target value or score (indicative of the highest rotation), and that also passes a visibility and obstruction test, is selected as the target edge 210 For the selected target edge, a plurality of rotation LERP (linear interpolation) values is calculated based on the rotation target value or score associated with the selected target edge as well as the direction (left/right) of rotation around the target edge 212 The calculated plurality of rotation LERP values is applied to the weapon and arms view model (associated with the player in game space), view roll and world model in order to cause visual rotation of the view model to occur As the player moves through the game space, steps 202 to 212 are continuously repeated

FIG. 2

SYSTEMS AND METHODS FOR IMPROVED CORNER SLICING IN A MULTIPLAYER VIDEO GAME

CROSS-REFERENCE

The present specification relies on U.S. Patent Provisional Application No. 63/377,760, titled "Systems and Method for Improved Corner Slicing in a Multiplayer Video Game", and filed on Sep. 30, 2022, for priority. The above-mentioned application is herein incorporated by reference in its entirety.

FIELD

The present specification is related generally to the field of video games and graphics processing. More specifically, the present specification is related to systems and methods for a) graduated, incremental rotation of a player's weapon and arms as viewed (view model) around an edge or corner around which the player intends to turn, i.e. engage in a corner slice, b) rolling and translation of the weapon and arms view model towards a target edge in hip mode, and/or c) rolling of the weapon and arms view model in ADS (Aim Down Sight) mode.

BACKGROUND

There are typically several edges and corners throughout a world geometry in a FPS (First Person Shooter) video game, which can be used for various purposes, such as mounting a weapon or mantling. When players approach and turn a corner, they tend to "pie slice" the corner. "Pie slicing" or "corner slicing" refers to a careful, incremental movement of the player's weapon and arms view model, or visual perspective, around the corner in an attempt to avoid getting ambushed by an opponent.

If not handled properly, players may experience jittery movements around corners or a visual "pop" where a weapon or part of a person's anatomy (viewed from a first-person perspective) abruptly jumps from a first visual position to a second, more distant visual position without passing through the incremental positions in between the first and second visual positions. From a player's perspective, this can be very jarring and detract from the overall game experience. Therefore, there is a need for systems and methods that enable gradual, incremental rotation of a player's weapon and arms as visually perceived (view model) around an edge that the player intends to corner slice. There is also a need for imparting realistic motion and dynamism to the player's weapon and arms view model as the player engages in cover negotiation.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification is directed toward a computer-implemented method for enabling a rotation of a player's weapon and arms view model around a target edge during a video gameplay session in a multi-player gaming network, wherein the multi-player gaming network comprises at least one game server and a plurality of client devices in data communication with the at least one game server, wherein each of the plurality of client devices is configured to execute the video gameplay session, and wherein a first game module is stored in the at least one game server and a second game module is stored in each of the plurality of client devices, the method being executed by the first and second game modules and comprising: identifying one or more candidate edges from a plurality of potential edges within the player's view in the video gameplay session; determining a rotation target score for each of the one or more candidate edges; sorting the one or more candidate edges on the basis of their rotation target scores; selecting the target edge from the sorted one or more candidate edges; determining a plurality of rotation LERP values for the target edge based on the rotation target value of the target edge and a direction of rotation of the player around the target edge; applying the plurality of rotation LERP values to the weapon and arms view model, view roll and world model in order to cause rotation of the weapon and arms view model around the target edge; and causing said rotation to be rendered in one or more of the plurality of client devices.

Optionally, selecting the target edge comprises selecting the target edge that is in view of the player and has a highest rotation target score.

Optionally, the second game module, in communication with the first game module, is configured to query and cache the plurality of potential edges.

Optionally, the one or more candidate edges are identified by rejecting one or more edges of the plurality of potential edges that fail one or more of a) an angle between the player Eye Forward Vector and an Edge Normal Vector is larger than a predefined maximum angle, b) the Edge Normal Vector is in the same direction as the Eye Forward Vector, c) the Player Eye Point is on a wrong side of the Player Facing Wall, d) the Player Eye Point is substantially far past the edge, e) the Player Eye Point is past the edge and the edge is not currently selected, and f) the angle between player Eye Forward Vector and Eye To Edge Vector is larger than a predefined value.

Optionally, the rotation target score for an edge is determined based on the player's position relative to the edge and/or how much rotation would be achievable from the edge.

Optionally, the target edge is one toward which the player looks at and approaches.

Optionally, the rotation target score is a function of a first parameter defined as a linear map function of a first distance and a second parameter defined as a linear map function of a second distance. Still optionally, the first distance is a distance between the Player Eye Point to the Edge Point and the second distance is the shortest distance between the Player Eye Forward Vector to the Edge Point.

Optionally, the first and second game modules are configured to determine if the player has engaged in cover negotiation with respect to the target edge, and wherein based on the determination, the first and second game modules cause the weapon and arms view model to have a first behavior in hip mode and a second behavior in ADS (Aim Down Sight) mode. Still optionally, the first behavior is characterized by rolling and translation of the weapon and arms view model away from the target edge, and wherein the second behavior is characterized by rolling of the weapon and arms view model so that the weapon and arms view model is canted away from the target edge while being centered on the sight.

Still optionally, cover negotiation engagement is determined if at least one of the player is within a cover negotiation initiate distance from the target edge, the target edge is within the player's cover negotiation initiate angle, the player has a minimum cover negotiation min speed relative to the target edge, or the player has a cover negotiation maximum speed. Optionally, the cover negotiation initiate distance ranges from 1 to 1000 units, the cover negotiation initiate angle ranges between 1 degree to 180 degrees, cover negotiation min speed is 0 inches/second and the cover negotiation max speed is 1000 inches/second.

Optionally, a magnitude and a speed of implementation of the first behavior is determined based on a first plurality of customizable parameters, and wherein a magnitude and a speed of implementation of the second behavior is determined based on a second plurality of customizable parameters. Optionally, the first plurality of customizable parameters comprises one or more of a cover negotiation weapon hip tracking speed, a cover negotiation weapon hip position offset, a cover negotiation weapon hip rotation left, a cover negotiation weapon hip pivot offset, a cover negotiation weapon hip translation, and a cover negotiation weapon hip translation left.

Optionally, the cover negotiation weapon hip tracking speed ranges from 0.01 inches/second to 1000 inches per second, the cover negotiation weapon hip position offset ranges from –100 to 100 inches, cover negotiation weapon hip rotation left ranges from 0 to 90 degrees, the cover negotiation weapon hip translation ranges from –20 to 20 units, and the cover negotiation weapon hip translation left ranges from –20 to 20 units.

Optionally, the second plurality of customizable parameters comprises one or more of a cover negotiation weapon ADS tracking speed, a cover negotiation weapon ADS position offset, cover negotiation weapon ADS magnitude left, and cover negotiation weapon ADS pivot offset. Still optionally, the cover negotiation weapon ADS position offset ranges from –100 to 100 inches, and the cover negotiation weapon ADS magnitude left ranges from 0 to 90 degrees.

Optionally, the second game module is configured to cause a virtual camera associated with the video gameplay session to roll if the player has engaged in cover negotiation.

Optionally, an amount of virtual camera roll is determined based on cover negotiation camera roll hip and cover negotiation camera roll ADS.

Optionally, the cover negotiation camera roll hip has a range from 0 degree to 90 degrees and cover negotiation camera roll ADS has a range from 0 degree to 90 degrees.

Optionally, the first and second game modules determine if the player has disengaged from cover negotiation with respect to the target edge based on at least one of the player being no longer within cover negotiation initiate distance of the target edge or the player being no longer facing within cover negotiation initiate angle of the target edge.

In some embodiments, the present specification is directed toward a computer-implemented method for enabling rotation of a player's weapon and arms view model around a target edge during a video gameplay session in a multi-player gaming network, wherein the multi-player gaming network comprises at least one game server and a plurality of client devices in data communication and located remote from each other, wherein each of the plurality of client devices is configured to execute the video gameplay session, and wherein a first game module is stored in the at least one game server and a second game module is stored in each of the plurality of client devices, the method being executed by the first and second game modules and comprising: identifying one or more candidate edges from a plurality of potential edges within the player's view in the video gameplay session; determining a rotation target score for each of the one or more candidate edges; sorting the one or more candidate edges on the basis of their rotation target scores; selecting the target edge from the sorted one or more candidate edges, wherein the target edge has a highest rotation target score and is in view of the player; calculating a plurality of rotation LERP values for the target edge based on the rotation target value of the target edge and a direction of rotation of the player around the target edge; and applying the plurality of rotation LERP values to the weapon and arms view model, view roll and world model in order to cause rotation of the weapon and arms view model around the target edge, wherein the weapon and arms view model has a first behavior in hip mode and a second behavior in ADS mode when the player engages in cover negotiation with respect to the target edge.

Optionally, the first behavior is characterized by rolling and translation of the weapon and arms view model away from the target edge, and wherein the second behavior is characterized by rolling of the weapon and arms view model so that the weapon and arms view model is canted away from the target edge while being centered on the sight.

Optionally, the player engages in cover negotiation engagement if the following conditions are true: the player is within a cover negotiation initiate distance from the target edge, the target edge is within the player's cover negotiation initiate angle, the player has a minimum cover negotiation min speed relative to the target edge, and the player has a maximum cover negotiation max speed.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2 is a flowchart detailing a method for enabling automated, gradual rotation of a player's weapon and arms as viewed around an edge that the player intends to corner slice, in accordance with some embodiments of the present specification.

DETAILED DESCRIPTION

Figure 1:
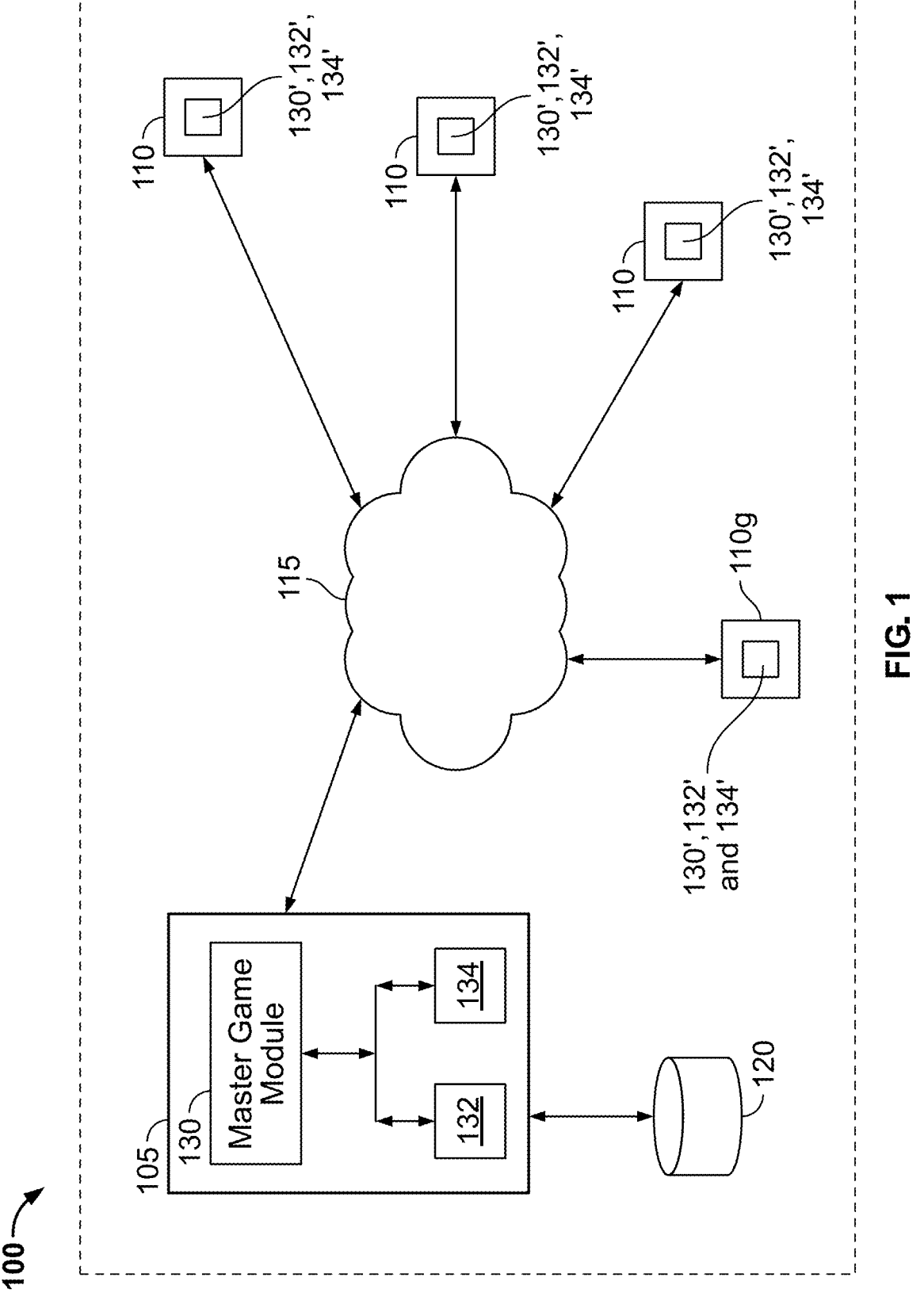
FIG. 1 is a block diagram showing a framework for a multi-player online gaming system or environment, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "unit/units" may be used to refer to any measurement or denominational unit in the context of the specification. For example, and not limited to such example, unit may refer to "inch" or any appropriate metric equivalent. In another example, and not limited to such example, unit may refer to "degree" to indicate a degree of rotation.

The term "cover", as used in this disclosure, may refer to any barrier that extends above a player's current weapon height (variable depending on stance).

The term "cover edge", as used in this disclosure, may refer to a vertical end of a piece of cover that a player will move through (for example, a window, a door) or move past (for example, corner of a wall or stack of crates).

The term "player eye point", as used in this disclosure, may refer to an origin of the player eye in world space.

The term "eye forward vector", as used in this disclosure, may refer to a forward vector of the player looking at angles in world space.

The term "eye up vector", as used in this disclosure, may refer to an up vector of the player looking at angles in world space.

The term "edge", as used in this disclosure, may refer to a line where the surfaces of two objects (i.e. walls) meet. The term "cover edge", as used in this disclosure may refer to a vertical edge of an object that a player is using as cover and looking to slice the pie around.

The term "edge point", as used in this disclosure, may refer to an origin of a point at the cover edge in world space where the edge and a plane defined by the "player eye point" and the "eye up vector" intersect.

The term "eye to edge vector", as used in this disclosure, may refer to a vector between the "player eye point" and the "edge point".

The term "edge normal vector", as used in this disclosure, may refer to a normal vector that points away from the player facing a wall.

The term "player facing wall", as used in this disclosure, may refer to a surface of the wall upon which the player is taking cover.

The term "hip mode", as used in this disclosure, indicates that a player weapon is at hip height. The player can move freely and the field of view is wide.

The term "ADS mode", as used in this disclosure, indicates that a player brings his weapon up to aim through the sights. In this mode, movement speed, turn rates, and field of view is restricted.

The term "module", "application", "tool" or "engine" used in this disclosure may refer to computer logic utilized to provide a desired functionality, service or operation by programming or controlling a general purpose processor.

Stated differently, in some embodiments, a module, application, tool or engine implements a plurality of instructions or programmatic code to cause a general purpose processor to perform one or more functions. In various embodiments, a module, application, tool or engine can be implemented in hardware, firmware, software or any combination thereof. The module, application, tool or engine may be interchangeably used with unit, logic, logical block, component, or circuit, for example. The module, application, tool or engine may be the minimum unit, or part thereof, which performs one or more particular functions.

The term "a multi-player online gaming system/environment" or "massively multiplayer online gaming system/ environment" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Overview

FIG. 1 illustrates an embodiment of a multi-player online gaming or massively multiplayer online gaming system/environment 100 in which the systems and methods of the present specification may be implemented or executed. The system 100 comprises client-server architecture, where one or more game servers 105 are in communication with one or more client devices 110 over a network 115. Players and non-players, such as an administrator, may access the system 100 via the one or more client devices 110. The client devices 110 comprise computing devices such as, but not limited to, personal or desktop computers, laptops, Net-books, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 120. The database system 120 stores a plurality of game data associated with at least one game that is served or provided to the client devices 110 over the network 115. In some embodiments, the one or more game servers 105 may be implemented by a cloud of computing platforms operating together as game servers 105.

In accordance with aspects of the present specification, the one or more game servers 105 provide or implement a plurality of modules or engines such as, but not limited to, a master game module 130, a weapon and arms movement (WAM) module 132 (server side), and a virtual camera movement (VCaM) module 134. In some embodiments, each of the one or more client devices 110 is configured to implement or execute a plurality of client-side modules some of which are same as or similar to the modules of the one or more game servers 105. For example, in some embodiments each of the player and non-player client devices 110 executes a client-side game module 130' (also referred to as—client game module 130') that integrates a client-side weapon and arms movement (WAM) module 132' and a client-side virtual camera movement (VCaM) module 134'.

In some embodiments, at least one non-player client device 110g is used by the administrator to log into the one or more game servers 105 (via the client game module 130') and execute the modules 132 and 134 on the server to customize, adjust or modulate a plurality of parameters or tunables associated with the movement or behavior of the weapon and arms view model during cover negotiation and corner slicing. The values or states of the tuned plurality of parameters are stored in the at least one database 120.

While various aspects of the present specification are being described with reference to functionalities or programming distributed across multiple modules or engines 132 and 134, it should be appreciated that, in some embodiments, some or all of the functionalities or programming associated with these modules or engines may be integrated within fewer modules or in a single module—such as, for example, in the master game module 130 itself on the server side and in the client gaming module 130' on the client side.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the client devices 110 and transmits updates to all client devices 110 based on the received game data so that the game, on each of the client devices 110, represents the most updated or current status with reference to interactions of all players with the game. Thus, the master game module 130 transmits game data over the network 115 to the client devices 110 for use and rendering by the game module 130' to provide local versions and current status of the game to the players.

On the client-side, each of the one or more player client devices 110 implements the game module 130' that operates as a gaming application to provide a player with an interface between the player and the game. The game module 130' generates the interface to render a virtual environment, virtual space or virtual world associated with the game and enables the player to interact in the virtual environment to perform a plurality of game and other tasks and objectives. The game module 130' accesses game data received from the game server 105 to provide an accurate representation of the game to the player. The game module 130' captures and processes player inputs and interactions within the virtual world or environment and provides updates to the game server 110 over the network 115.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations.

Weapon and Arms Movement (WAM) Modules 132 (Server Side), 132' (Client Side)

In accordance with some aspects of the present specification, the server side WAM module 132 and client side WAM module 132' are configured to implement a plurality of instructions or programmatic code to enable automated, gradual visual rotational movement (also referred to as 'corner slicing') of a player's weapon and arms view model (to provide an effect of "leaning out", even though the player is not "leaning out") as the player approaches a specific edge or corner and a subsequent, automated shift of that rotation to another edge depending on where the player moves or points.

FIG. 2 is a flowchart detailing a method 200 of enabling automated, gradual visual rotation of a player's weapon and arms view model around an edge that the player intends to corner slice, in accordance with some embodiments of the present specification. In embodiments, the method 200 is implemented by the server-side WAM module 132 and client-side WAM module 132' together in communication with each other.

At step 202, to enable corner slicing, one or more candidate edges are identified from a plurality of potential edges within the player's view in the world geometry. In some embodiments, edge identification or selection commences with a query of the plurality of potential edges inside a player view frustum that are closest to the player. As is known, in geometry, a frustum is the portion of a solid that lies between one or two parallel planes that cut it, wherein the base faces are polygonal and the side faces are trapezoidal. The client-side game module 130', in communication with the master game module 130, is configured to execute querying and caching of the plurality of potential edges or candidate edges.

In embodiments, the plurality of potential edges is filtered in order to reject edges that do not meet any one of the following conditions:

An edge is rejected if an angle between the player Eye Forward Vector and the Edge Normal Vector is larger than a predefined, yet customizable, maximum angle (which, in embodiments, is defined by the parameter or variable 'cornerslice_Edge_maxAnglePlayer'). When the yaw angle is greater than cornerslice_Edge_maxAnglePlayer the player is not likely slicing this edge or corner since the player is not looking in the general yaw direction towards the edge. In various embodiments, Dvar: cornerslice_Edge_maxAnglePlayer has a range between 0 degrees and 220 degrees (also noted as [0, 220] degrees).

Reject an edge if the Player Eye Point is on a wrong side of the Player Facing Wall. That is, the edge must belong to an opposite side of an object such as, for example, a wall.

Reject an edge if the Player Eye Point is substantially past or too far from the edge or corner. This is because as the player pie slices the edge or corner, the player gradually moves past it (Dvar: cornerslice_edge_maxDistancePlayerPastEdgeAlongWall has a range of [0, 220] units, wherein the Dvar: cornerslice_edge_maxDistancePlayerPastEdgeAlongWall refers to the maximum distance between the player and the edge along the wall after the player is past the edge or the corner.). In an embodiment, the range is 0 inch to 220 inches (wherein the units are in inches).

Reject an edge if the Player Eye Point is past the corner and the edge is not currently selected. When the player is already past an edge or corner, the player is not currently slicing it, the player looks towards the edge and rejects it (cornerslice_edge_maxDistancePlayerPastEdgeAlongWallNewCorner has a range of [0, 220] units, wherein the cornerslice_edge_maxDistancePlayerPastEdgeAlongWallNewCorner refers to the maximum distance between the player and the edge along the wall after the player is past an edge or corner and the player has not selected the edge or is not currently slicing it. In an embodiment, the range is 0 inch to 220 inches (wherein the units are in inches).

Reject an edge if the angle between the player Eye Forward Vector and Eye To Edge Vector is substantially large. The angle is defined by a line from Edge Point to Player Eye Point, and a line from the Player Eye Point in the direction of the Eye Forward Vector. The angle is indicative of whether the player is looking towards the edge/corner or away from it (Dvar: cornerslice_edge_maxAngleToEdge has a range between 1 degree to 180 degrees (also noted as [1, 180] degrees). In some embodiments, the cornerslice_edge_maxAngleToEdge is 60 degrees.

At step 204, a rotation target value or score is determined for each of the one or more candidate edges. The rotation target value or score is indicative of the rotation that may be derived from an edge. In various embodiments, an algorithm for determining the rotation target value is based on a plurality of variables such as, but not limited to, how close the player's view is to an edge, the player's position relative to the edge and/or how much rotation would be achievable from the edge.

In some embodiments, the algorithm is configured to select an edge that the player approaches (or is close/proximate to) and looks at. Thus, the player could be approaching or be closer to first and second edges but if the player is not looking at the second edge and instead looking at the first edge, then it is highly likely that the algorithm will select the first edge and not select the second edge.

In some embodiments, the rotation target value or score is a function of at least a first parameter determined as a linear map function of a distance between the Player Eye Point to the Edge Point. The first parameter provides a factor or value between 0 and 1 (this is unitless). The first parameter is, in an embodiment, indicative of how close the player is to the edge. A second parameter is determined as a linear map function of a shortest distance between the Player Eye Forward Vector to the Edge Point. The second parameter provides a factor or value between 0 and 1 (this is unitless). The second parameter is, in an embodiment, indicative of how close the player view is to the edge (that is, how close the edge is to the center of the player's screen). In some embodiments, the first and second parameters are multiplied to provide a rotation target value or score between 0 and 1. However, as mentioned earlier, the rotation target value or score is any function or combination of the first parameter and the second parameter.

Stated differently, in embodiments, the rotation target value or score is the total rotation amount calculated for a candidate edge. The total rotation amount has two factors: (a) a first factor which is rotation from player distance to the candidate edge, and (b) a second factor which is rotation from the view angle towards the candidate edge. Each factor is calculated by linearly mapping [0,1] the factor between a set minimum and a set maximum rotation. The first factor and the second factor are then multiplied together, giving a total rotation between [0,1]. A linear map enables mapping a value between a minimum and maximum and returns a value in the range [0,1]. Following are specific parameters related to the first factor (a) and second factor (b) described above:

Dvar cornerslice_rotation_distanceNear has a default value of 10 units and a range of 1 to 100 units (also noted as [1,1000] units), wherein the Dvar cornerslice_rotation_distanceNear refers to the distance to a corner where rotation weight is at maximum.

Dvar cornerslice_rotation_distanceFar has a default value of 100 units and a range of 1 to 1000 (also noted as [1,1000]) units, wherein the Dvar cornerslice_rotation_distanceFar refers to the distance to a corner wherein rotation weight is at minimum. This is the minimum distance to consider an edge for corner slicing. If selected, this would be 'cover negotiation initiate distance' having a range of 1 to 1000 units.

Dvar cornerslice_rotation_angleNear has a default value of 0 degree and a range of 0 degrees to 180 degrees (also noted as [0,180] degrees), wherein the Dvar cornerslice_rotation_angleNear refers to the angle from a corner to eye forward where rotation weight is at maximum.

Dvar cornerslice_rotation_angleFar has a default value of 25 degrees and a range of 0 degrees to 180 degrees (also noted as [0,180] degrees), wherein the Dvar cornerslice_rotation_angleFar refers to the angle from a corner to eye forward where rotation weight is at minimum.

At step 206, the one or more candidate edges are sorted based on the rotation target value or score associated with each of the one or more candidate edges. In some embodiments, the one or more candidate edges are sorted in descending order of their associated rotation target value or score. That is, the one or more candidate edges are sorted from the highest rotation to the lowest.

At step 208, an edge (from the sorted one or more candidate edges) that has the highest associated rotation target value or score (indicative of the highest rotation), and that also passes a visibility test, is selected as the target edge. It should be appreciated that the candidate edge with a high rotation target value or score is selected as the target edge since the corresponding high rotation is indicative of or directly proportional to the edge that the player intends to corner slice. In embodiments, the visibility test ensures that the selected target edge is an edge which provides the player with unobstructed visibility. The visibility test performs a series of ray traces that make sure that the selected target edge is visible. Thus, the one or more candidate edges, sorted in descending order of the associated rotation target value or score, are tested for visibility and the first candidate edge that passes the test is selected as the target edge for corner slicing.

At step 210, for the selected target edge, a plurality of rotation LERP (linear interpolation) values is calculated based on the rotation target value or score associated with the selected target edge as well as the direction (left/right) of rotation around the target edge. It should be appreciated that once the target edge is selected, the associated rotation target value or score and the direction of rotation (left/right) of the player around the target edge are used in order to determine a rotation target position (wherein a range of rotation target is −1, 1 such that −1 refers to a maximum rotation left and 1 refers to a maximum rotation right) of the player for corner slicing. Since the changes in rotation target position are instantaneous, the plurality of rotation LERP values are calculated from a current position to the rotation target position over a predefined, yet customizable, tracking speed, wherein the tracking speed ranges from 0.1 degrees per second to 10 degrees per second (also noted as [0.1, 10]). The tracking speed is how fast the player LERPs towards the target rotation. Tracking speed is measured in rotation x (units of transform/second). The tracking speed is applied to the transforms of 1p view model offset and angles, 1p view roll, and view model shoulders and arms. Application of the tracking speed, to calculate the plurality of rotation LERP values, provides smooth transitions between the player's current position and the rotation target position. The transition spans a time duration because if a change or transition is too instantaneous, it 'pops' and is perceived as unnatural, jerky movements. In embodiments, the tracking speed may depend upon one or more variables such as, for example, the type of weapon.

At step 212, the calculated plurality of rotation LERP values is applied to the weapon and arms view model (associated with the player in game space), the 1p view roll and view model shoulders and arms in order to cause visual rotation of the view model. The view model is transformed based on the applied plurality of rotation LERP values.

In some embodiments, the view model transforms are based on the plurality of rotation LERP values determined from corner slice transform targets which are defined for each weapon in the weapon design data. A single LERP rotation value is used with each transform target to smoothly lerp to each transform target. All transform targets are reached at the same time. The following is a non-limiting example of parameters in the case of "Assault Rifle t10_ar_p01_coslo723":

Tracking Speed: 8
    Corner Slice Right
    Hip Offset (forward, left, up, respectively): (−1.1, −1.8, −0.2)
    Roll: 30

When corner slicing right, this weapon will LERP to the transform targets as specified:

1p view model position in the forward, left, up directions will LERP to reach an offset of (−1.1, −1.8, −0.2), respectively.
    1p view model roll will LERP to the right to reach 30 degrees.
    1p view angle roll will LERP roll to the right to reach Dvar cornerslice_viewRoll of 6 degrees
    3p world model will weight in an animation specific to this weapon using the corner slice LERP rotation as the weight factor.

Figure 3:
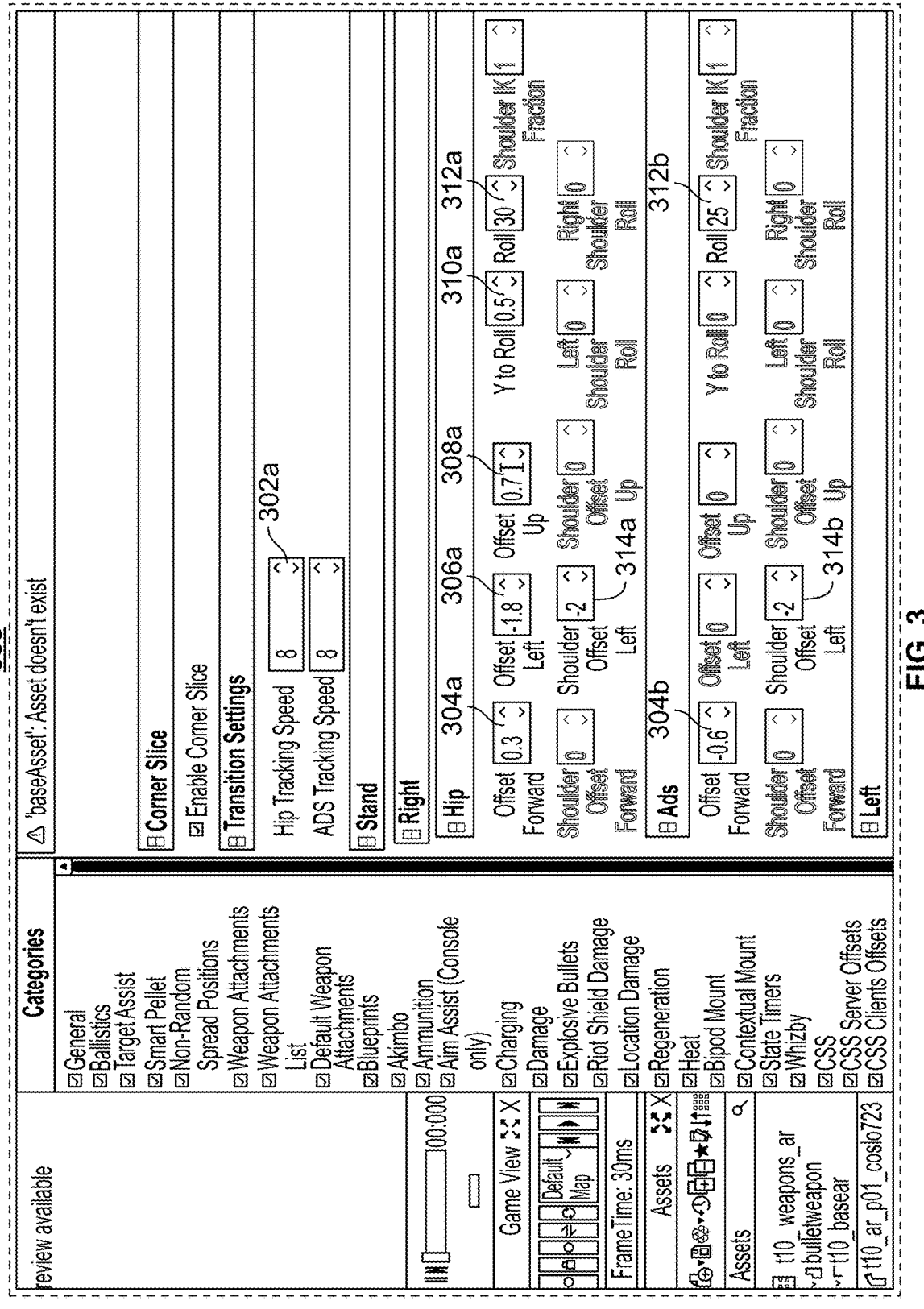
FIG. 3 is an exemplary chart of a plurality of transform target values defined for a weapon type when corner slicing, in accordance with some embodiments of the present specification.
Figure 3:
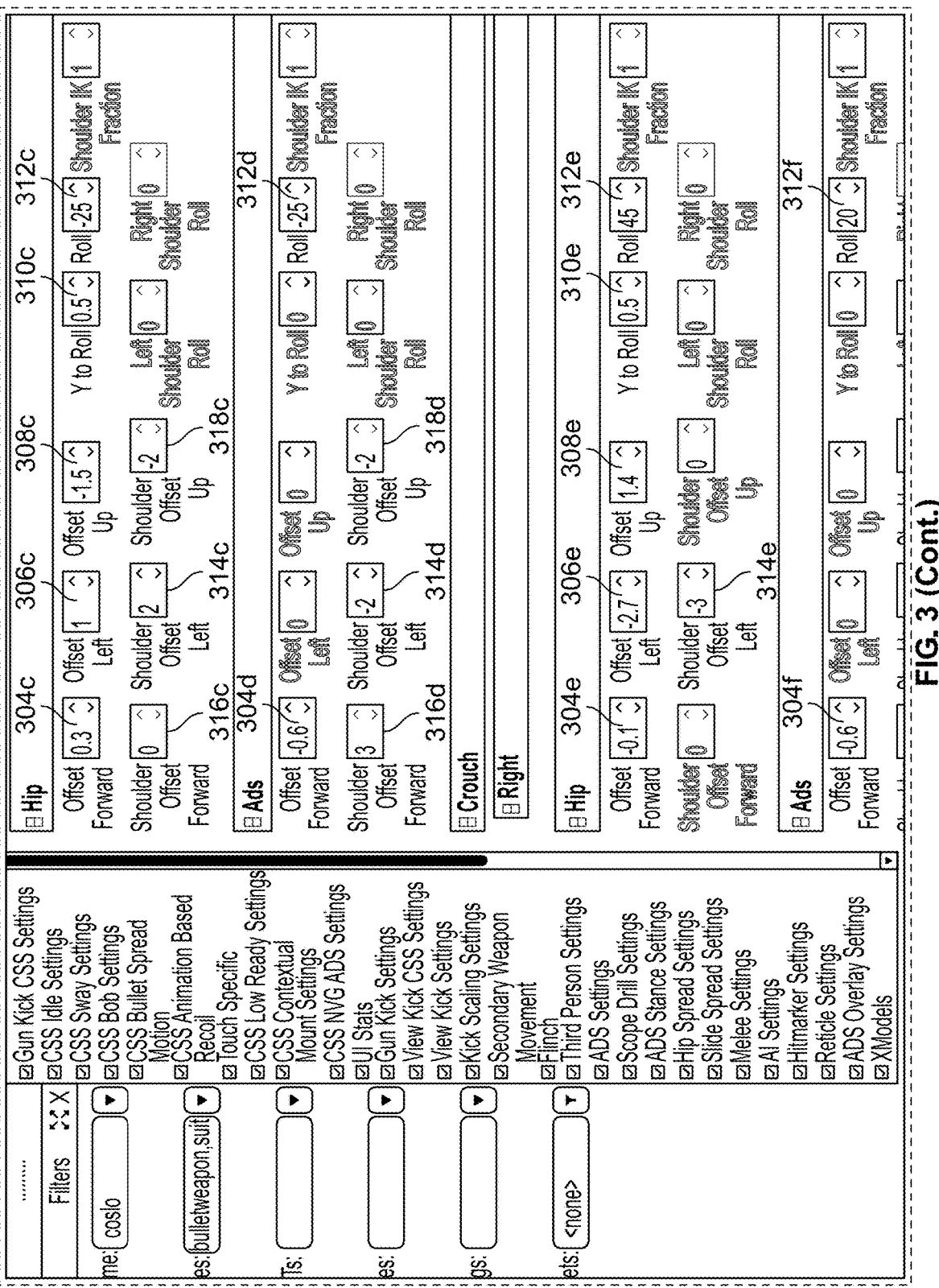

FIG. 3 shows an exemplary graphical user interface 300 showing a plurality of transform target values defined for a weapon type when corner slicing, in accordance with some embodiments of the present specification. Thus, in order to LERP to a particular direction in hip or ADS mode, the corresponding transform target value in the chart 300 (for example, offset forward values 302', 304' for right and left hip 302, 304, etc.) is used as a factor and multiplied by the LERP rotation target (associated with the edge that the player intends to corner slice) to output the LERP transform target for the player's view model position. It should be appreciated that corner slice transforms may be different in each of the hip and ADS modes. Stance also affects corner slice, therefore there are corresponding transform targets for the player standing and crouching. For example, in various embodiments, the chart 300 enables customization of transform target values for a plurality of weapon specific parameters or tunables, as follows: cover negotiation weapon hip tracking speed 302a; cover negotiation weapon ADS tracking speed 302b; a plurality of parameters, in standing stance right hip mode, such as offset forward 304a, offset left 306a, offset up 308a, Y to roll 310a, roll 312a and shoulder offset left 314a; a plurality of parameters, in standing stance right ADS mode, such as offset forward 304b, roll 312b and shoulder offset left 314b; a plurality of parameters, in standing stance left hip mode, such as offset forward 304c, offset left 306c, offset up 308c, Y to roll 310c, roll 312c, shoulder offset forward 316c, shoulder offset left 314c and shoulder offset up 318c; a plurality of parameters, in standing stance left ADS mode, such as offset forward 304d, roll 312d, shoulder offset forward 316d, shoulder offset left 314d, and shoulder offset up 318d; a plurality of parameters, in crouching stance right hip mode, such as offset forward 304e, offset left 306e, offset up 308e, Y to roll 310e, roll 312e and shoulder offset left 314e; and a plurality of parameters, in crouching stance right ADS mode, such as offset forward 304f, and roll 312f.

At step 214, as the player moves through the game space, steps 202 to 212 are continuously repeated. Thus, as soon as the method 200 selects a new target edge for corner slicing from steps 202 to 208, new rotation LERP values are automatically calculated at step 210 which are then applied, at step 212, to the weapon and arms view model, the 1p view roll and 3p world model shoulders and arms, thereby causing visual rotation of the view models to occur at the new target edge.

Additionally, in various embodiments, 'moving' and 'looking' with respect to a selected target edge also modifies the rotation target as follows: a) rotation increases as the player moves closer to the target edge whereas rotation decreases as the player moves away/farther from the target edge, b) rotation increases as the player looks closer to the target edge whereas rotation decreases as the player looks away from the target edge.

Weapon Cover Negotiation

Weapon cover negotiation is the procedural movement of a player's weapon and arms view model based on the player's proximity to the edge of a portion of cover. The present specification is directed towards adding realistic motion and dynamism to the player's weapon and arms view model in order to emphasize a feeling of operating as a trained combat operative. In some embodiments, the WAM modules 132, 132' are configured with an associated dynamic variable or parameter (referred to as 'cover negotiation enabled'). To enable cover negotiation, the 'cover negotiation enabled' parameter is set to a 'true' state. In embodiments, by default the 'cover negotiation enabled' parameter is set to a 'false' state (which refers to a "disabled" state).

In various embodiments, each weapon can also turn corner slice on/off. Performing some actions turns off the corner slicing. An event that may take the player out of a ready-to-engage state disables corner slicing. Such an event may include, for example, the player reloading, sprinting, sliding, throwing grenades or interacting with world elements.

In accordance with some aspects of the present specification, the WAM modules 132, 132' are configured to implement a plurality of instructions or programmatic code to enable automated weapon and arms view model rotation (that is, cover negotiation) while aiming from the hip or ADS (Aim Down Sight) as the player approaches and rotates round an edge of a cover. Specifically, with reference to weapon and arms view model hip behavior, as the player approaches and rounds the edge of cover, such as a doorway or the end of a wall, the weapon and arms view model rotates (rolls) away from that edge. In some embodiments, a minor translation of the weapon and arms view model is introduced away from the edge. With reference to weapon and arms view model ADS behavior, as the player approaches and rounds the edge of cover, the weapon and arms view model rotates (rolls) slightly so that it is canted (slanted or tilted) away from that edge, but still centered on the sight. In embodiments, cover negotiation is intended to have minimal impact on gameplay.

First-Person Weapon and Arms View Model Behavior

In embodiments, the WAM modules 132, 132' enable and manage visual behavior or movement of first person weapon and arms view model through following stages/phases and aspects of cover negotiation:

Initiating Cover Negotiation. In embodiments, for the cover negotiation movement/behavior to begin or be engaged, the WAM modules 132, 132' ensure that the following conditions must be true:

The player must be within a predefined, yet customizable or tunable, distance (referred to as 'cover negotiation initiate distance') from a cover edge. In some embodiments, the 'cover negotiation initiate distance' is 120 units. In various embodiments, Dvar cornerslice_query_distance (indicative of the distance between the near and far plane for the player view frustum. Edges within this frustum are considered for corner slicing) has a default value of 100 units and a range of 10 units to 1000 units (also noted as [10,1000] units). Thus, a value of the 'cover negotiation initiate distance' parameter determines how close the player must be to a cover edge to start cover negotiation.

The cover edge must be within the player's field of view as determined by a predefined, yet customizable or tunable, angle (referred to as 'cover negotiation initiate angle' or Dvar: cornerslice_edge_maxAngleToEdge) from the direction the player is facing. In some embodiments, the 'cover negotiation initiate angle' or Dvar: cornerslice_edge_maxAngleToEdge is 60 degrees. In various embodiments, the 'cover negotiation initiate angle' or Dvar: cornerslice_edge_maxAngleToEdge has a range between 1 degree to 180 degrees (also noted as [1, 180] degrees). In various embodiments, the player view frustum parameters and ranges are as follows:

Dvar cornerslice_query_distance has a default value of 100 units and a range of 10 units to 1000 units (also referred to as [10,1000] units).

Dvar cornerslice_query_halfwidth_near has a default value of 10 units and a range of 1 unit to 1000 units (also noted as [1,1000] units).

Dvar cornerslice_query_halfwidth_far has a default value of 20 units and a range of 1 unit to 1000 units (also noted as [1,1000] units).

Dvar cornerslice_query_halfheight_near has a default value of 5 units and a range of 1 unit to 1000 units (also noted as [1,1000] units).

Dvar cornerslice_query_halfheight_far has a default value of 5 units and a range of 1 unit to 1000 units (also noted as [1,1000] units).

The player may have a predefined, yet customizable or tunable, minimum movement speed (referred to as 'cover negotiation min speed'). In some embodiments, the 'cover negotiation min speed' is 0 inches/second (always on). Thus, a value of the 'cover negotiation min speed' parameter determines a minimum movement speed required to start cover negotiation.

The player may have a predefined, yet customizable or tunable, maximum movement speed (referred to as 'cover negotiation max speed'). In some embodiments, the 'cover negotiation max speed' is 1000 inches/second (always on). Thus, a value of the 'cover negotiation max speed' parameter determines a maximum movement speed required to start cover negotiation.

Edge Selection. If more than one cover edge meets the aforementioned conditions to initiate cover negotiation then, in some embodiments, the WAM modules 132, 132' select and engage with the edge closest to the player (refer the edge selection steps 202 to 208 of FIG. 2).

Weapon and Arms View Model Movement, 1p view roll and 3p world model animation. Once cover negotiation is engaged, the WAM modules 132, 132' quickly shift the weapon and arms view model to an adjusted or modified position, for example, canted (slanted or tilted) position, until cover negotiation ends. In embodiments, the magnitude and speed of the view model adjustment are defined by weapon specific parameters or tunables. That is, each asset has a plurality of associated customizable parameters or tunables that control the weapon and arms view model motion or behavior during cover negotiation. In some embodiments, the weapon specific parameters or tunables are described as follows:

Hip Mode

Cover negotiation weapon hip tracking speed

This parameter is indicative of how fast a player LERPs towards a target edge. In some embodiments, the cover negotiation weapon hip tracking speed is 5 inches/second and has a range of 0.01 inches/second to 1000 inches per second (also noted as [0.01, 1000] inches/second).

Rotational motion

Cover negotiation weapon hip position offset X/Y/Z.

This parameter is indicative of the maximum magnitude of X, Y, and Z position offset (X, Y and Z being the three axes in three-dimensional space) of the weapon while holding at the hip and rounding cover to the right. In some embodiments, the 'cover negotiation weapon hip position offset X/Y/Z' ranges from −100 to 100 inches.

Optionally, the weapon and arms view model has an associated Boolean parameter (referred to as 'hip rotation same for left cover') that can be set to 'true' in order to reuse the first set of magnitudes for weapon rotation on both sides. Otherwise, a corresponding parameter (referred to as 'cover negotiation weapon hip rotation left X/Y/Z') controls rotation when rounding cover to the left. In some embodiments, the 'cover negotiation weapon hip rotation left' ranges from 0 to 90 degrees.

Cover negotiation weapon hip pivot offset X/Y/Z.

This parameter enables modulation/modification of the pivot point for rotation of the weapon and arms view model.

Translational motion

Cover negotiation weapon hip translation X/Y/Z.

This parameter is indicative of the maximum magnitude (or scalar) of X, Y, and Z translation of the weapon and arms view model while holding the weapon at the hip and rounding cover to the right. In some embodiments, the 'cover negotiation weapon hip translation X/Y/Z' ranges from −20 to 20 units.

Optionally, the weapon and arms view model includes an associated Boolean parameter (referred to as 'hip translation same for left cover') that can be set to 'true' in order to reuse the first set of magnitudes for weapon translation on both sides. Otherwise, a corresponding parameter (referred to as 'cover negotiation weapon hip translation left X/Y/Z') controls translation when rounding cover to the left. In some embodiments, the 'cover negotiation weapon hip translation left X/Y/Z' ranges from −20 to 20 units.

ADS (Aim Down Sights) Mode

Cover negotiation weapon ADS tracking speed

This parameter is indicative of how fast a player LERPs towards a target edge in ADS. In various embodiments, a translation range in each directional axis is −100 to 100 inches (also noted as [−100, 100] inches) and the roll range in each direction is −180 degrees to 180 degrees (also noted as [480, 180] degrees).

Rotational motion

Cover negotiation weapon ADS position offset X/Y/Z

This parameter is indicative of the maximum magnitude of X, Y, and Z position offset of the weapon and arms view model while ADS and rounding cover to the right. In some embodiments, the 'cover negotiation weapon ADS position offset X/Y/Z' ranges from −100 to 100 inches.

Optionally, the weapon and arms view model includes an associated Boolean parameter (referred to as 'ADS magnitudes same for left cover') that can be set to 'true' in order to reuse the first set of magnitudes for weapon and arms view model rotation on both sides. Otherwise, a corresponding parameter (referred to as 'cover negotiation weapon ADS magnitude left X/Y/Z') controls rotation when rounding cover to the left. In some embodiments, the 'cover negotiation weapon ads magnitude left X/Y/Z' ranges from 0 to 90 degrees.

Cover negotiation weapon ADS pivot offset X/Y/Z

This parameter enables modulation/modification of the pivot point for rotation of the weapon and arms view model.

Virtual camera movement. Once cover negotiation is engaged, the client-side VCaM module 134' is configured to implement a subtle amount of virtual camera roll. This camera roll is similar to what is seen when sprint turning and weapon mounting. In embodiments, the camera roll LERPs from neutral to a predefined, yet customizable, value—Dvar cornerslice_viewRollTrackSpeed having a default value of 6 degrees per second and a range of [1,100] degrees per second. The amount of camera roll is tunable for each weapon (Dvar cornerslice_viewRoll has a default value of 6 degrees (rotation) and a range of 0 degrees to 90 degrees (also noted as [0,90] degrees of rotation) at hip and in ADS using the following customizable parameters: a) cover negotiation camera roll hip (that is, camera roll during cover negotiation at hip), which has a range from 0 degree to 90 degrees and in some embodiments is set to 3 degrees, and b) cover negotiation camera roll ADS (that is, camera roll during cover negotiation in ADS), which has a range from 0 degree to 90 degrees and in some embodiments, is set to 3 degrees.

Disengaging from cover. In embodiments, for the player to stop or disengage from cover negotiation the WAM modules 132, 132' are configured to ensure that at least one of the cover negotiation-initiating conditions are no longer met. In other words, cover negotiation disengagement starts when:

The player is no longer within 'cover negotiation initiate distance' of the currently selected cover edge, or The player is no longer facing within 'cover negotiation initiate angles' degrees of the cover edge.

In some embodiments, the same tracking speed parameters or tunables (that is, weapon and arms view model's cover negotiation blend time for hip and ADS) are used for exiting or disengaging cover negotiation as for starting or engaging cover negotiation. After exiting or disengaging cover negotiation (that is, when cover negotiation ends) a predefined, yet customizable, time duration (determined by a parameter referred to as 'cover negotiation cooldown') must pass before Cover Negotiation can initiate again. In some embodiments, a default value of the 'cover negotiation cooldown' time is 0 seconds (that is, no cool down to start).

Switching between cover edges. In embodiments, if a player is engaged in cover negotiation with reference to a first cover edge and moves such that a second cover edge is valid and its scored rotation is greater than the first cover edge, the WAM modules 132, 132' are configured to cause the player's weapon and arms view model to LERP directly to the appropriate second rotation and translation from its current or first values. The same tracking speed parameters or tunables that is, weapon and arms view model's cover negotiation tracking speed for hip and ADS are used for switching as for entering or exiting cover negotiation.

Third Person Weapon and Arms World Model Behavior

In embodiments, the WAM modules 132, 132' are configured to visually represent, in third person, the movement or behavior of weapon and arms during cover negotiation (engagement, disengagement, and switching). The third person weapon and arms world model movement or behavior during cover negotiation is visually distinct from side strafing animations. While side strafing left and right, the torso, arms, and head also shift left and right. Usually the shoulders lead in the direction of side strafing movement. Corner slice is not supposed to move the torso side to side, only the head, arms, and weapon.

Restrictions—In embodiments, the WAM modules 132, 132' are configured to disable cover negotiation while the player is any of the following states:

Prone
Diving to prone
Sliding
Juking
Sprinting/Tactical sprinting
Reloading
Melee
Mantling
Weapon mounting The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A computer-implemented method for enabling a rotation of a player's weapon and arms, as viewed from the player's perspective, around a target edge during a video gameplay session in a multi-player gaming network, wherein the multi-player gaming network comprises at least one game server and a plurality of client devices in data communication with the at least one game server, wherein each of the plurality of client devices is configured to execute the video gameplay session, and wherein a first game module is stored in the at least one game server and a second game module is stored in each of the plurality of client devices, the method being executed by the first and second game modules and comprising:

identifying one or more candidate edges from a plurality of potential edges within the player's view in the video gameplay session;

determining a rotation target score for each of the one or more candidate edges, wherein the rotation target score is a function of a distance of the player to a respective one of the one or more candidate edges and a degree to which the player is viewing said respective one of the one or more candidate edges;

sorting the one or more candidate edges on the basis of their rotation target scores;

selecting the target edge from the sorted one or more candidate edges;

determining a plurality of rotation linear interpolation (LERP) values for the target edge based on the rotation target value of the target edge and a direction of rotation of the player around the target edge, wherein the plurality of rotation LERP values comprise a series of incremental transform values for modifying a position of the player over time;

applying the plurality of rotation LERP values to the player's weapon and arms, view roll and world model in order to cause rotation of the player's weapon and arms around the target edge; and causing said rotation to be rendered in one or more of the plurality of client devices.

2. The computer-implemented method of claim 1, wherein selecting the target edge comprises selecting the target edge that is in view of the player and has a highest rotation target score.

3. The computer-implemented method of claim 1, wherein the second game module, in communication with the first game module, is configured to query and cache the plurality of potential edges.

4. The computer-implemented method of claim 1, wherein the one or more candidate edges are identified by rejecting one or more edges of the plurality of potential edges that meet at least one of a) an angle between a player eye forward vector and an edge normal vector is larger than a predefined maximum angle, b) the edge normal vector is in the same direction as the eye forward vector, c) a player eye point is on a side of a player facing wall that does not belong to an opposite side of a wall, d) the player eye point is past the edge, e) the player eye point is past the edge and the edge is not currently selected, and f) the angle between the player eye forward vector and an eye to edge vector is larger than a predefined value.

5. The computer-implemented method of claim 1, wherein the rotation target score for an edge is determined based on at least one of the player's position relative to the edge and/or how much rotation would be achievable from the edge.

6. The computer-implemented method of claim 1, wherein the target edge is an edge toward which the player looks at and approaches.

7. The computer-implemented method of claim 1, wherein the rotation target score is a function of a first parameter defined as a linear map function of a first distance and a second parameter defined as a linear map function of a second distance.

8. The computer-implemented method of claim 7, wherein the first distance is a distance between a player eye point to an edge point and the second distance is the distance between a player eye forward vector to the edge point and is indicative of how close the player view is to the edge.

9. The computer-implemented method of claim 1, wherein the first and second game modules are configured to determine if the player has engaged in cover negotiation with respect to the target edge, wherein cover negotiation is a procedural movement of a player's weapon and arms view model based on the player's proximity to the edge of a portion of cover, and wherein based on the determination, the first and second game modules cause the weapon and arms view model to have a first behavior in hip mode and a second behavior in aim down sights (ADS) mode.

10. The computer-implemented method of claim 9, wherein the first behavior is characterized by rolling and translation of the weapon and arms view model away from the target edge, and wherein the second behavior is characterized by rolling of the weapon and arms view model so that the weapon and arms view model is canted away from the target edge while being centered on the sight.

11. The computer-implemented method of claim 9, wherein engaging cover negotiation comprises initiating cover negotiation and occurs when at least one of a) the player is within a predefined distance from the target edge, b) the target edge is within the player's cover negotiation initiate angle, wherein the cover negotiation initiate angle is a predefined angle within the player's field of view in which a cover edge must be within for cover negotiation to initiate, c) the player has a cover negotiation minimum speed relative to the target edge, wherein cover negotiation minimum speed is a predefined minimum movement speed required to initiate cover negotiation, and d) the player has a cover negotiation maximum speed, wherein the cover negotiation maximum speed is a predefined maximum movement speed required to initiate cover negotiation.

12. The computer-implemented method of claim 11, wherein the cover negotiation initiate distance ranges from 1 to 1000 units, the cover negotiation initiate angle ranges between 1 degree to 180 degrees, cover negotiation minimum speed is 0 inches/second and the cover negotiation maximum speed is 1000 inches/second.

13. The computer-implemented method of claim 9, wherein a magnitude and a speed of implementation of the first behavior is determined based on a first plurality of customizable parameters, and wherein a magnitude and a speed of implementation of the second behavior is determined based on a second plurality of customizable parameters.

14. The computer-implemented method of claim 13, wherein the first plurality of customizable parameters comprises one or more of a cover negotiation weapon hip tracking speed, a cover negotiation weapon hip position offset, a cover negotiation weapon hip rotation left, a cover negotiation weapon hip pivot offset, a cover negotiation weapon hip translation, and a cover negotiation weapon hip translation left.

15. The computer-implemented method of claim 14, wherein the cover negotiation weapon hip tracking speed ranges from 0.01 inches per second to 1000 inches per second, the cover negotiation weapon hip position offset ranges from −100 to 100 inches, and the cover negotiation weapon hip rotation left ranges from 0 to 90 degrees.

16. The computer-implemented method of claim 13, wherein the second plurality of customizable parameters comprises one of a cover negotiation weapon aim down sights (ADS) tracking speed, a cover negotiation weapon ADS position offset, cover negotiation weapon ADS magnitude left, and cover negotiation weapon ADS pivot offset.

17. The computer-implemented method of claim 16, wherein the cover negotiation weapon ADS position offset ranges from −100 to 100 inches, and the cover negotiation weapon ADS magnitude left ranges from 0 to 90 degrees.

18. The computer-implemented method of claim 9, wherein the second game module is configured to cause a virtual camera associated with the video gameplay session to roll if the player has engaged in cover negotiation.

19. The computer-implemented method of claim 18, wherein an amount of virtual camera roll is determined based on cover negotiation camera roll hip and cover negotiation camera roll ADS.

20. The computer-implemented method of claim 19, wherein the cover negotiation camera roll hip has a range from 0 degree to 90 degrees and cover negotiation camera roll ADS has a range from 0 degree to 90 degrees.

21. The computer-implemented method of claim 9, wherein the first and second game modules determine if the player has disengaged from cover negotiation with respect to the target edge based on at least one of the player being no longer within cover negotiation initiate distance of the target edge or the player being no longer facing within cover negotiation initiate angle of the target edge.

* * * * *